United States Patent [19]

Brandt et al.

[11] Patent Number: 5,006,100
[45] Date of Patent: Apr. 9, 1991

[54] TWO-SPEED PLANETARY GEAR MECHANISM

[75] Inventors: Christopher D. Brandt; David C. Kettler, both of Peoria; Willis E. Windish, Pekin; William W. Blake, Kewanee, all of Ill.

[73] Assignee: Caterpillar Inc., Peoria, Ill.

[21] Appl. No.: 496,718

[22] Filed: Mar. 7, 1990

Related U.S. Application Data

[63] Continuation-in-part of Ser. No. 350,809, May 12, 1989, abandoned.

[51] Int. Cl.[5] .............................................. F16H 57/10
[52] U.S. Cl. ................................... 475/138; 475/299; 475/142; 475/146
[58] Field of Search ............... 475/138, 140, 142, 143, 475/146, 299

[56] References Cited

U.S. PATENT DOCUMENTS

| | | | |
|---|---|---|---|
| 2,331,684 | 10/1943 | Henningsen | 475/299 |
| 4,821,591 | 4/1989 | Adler | 475/299 X |
| 4,920,828 | 5/1990 | Kameda et al. | 475/299 |

Primary Examiner—Dirk Wright
Attorney, Agent, or Firm—Charles E. Lanchantin, Jr.

[57] ABSTRACT

A particularly compact planetary gear mechanism includes an axially shiftable ring gear to provide either a direct drive mode or a speed reduction ratio mode between an input sun gear thereof and an output planet carrier thereof. In a first embodiment, the ring gear is urged in a first direction by a compressible spring apparatus to a conjoint coupled relationship with the sun gear for direct drive. In a less frequently used mode the ring gear is urged by a hydraulically actuated annular piston closely encircling it into a fixed relationship with a stationary coupling in opposition to the compressible spring apparatus. A second embodiment has no spring apparatus so that the annular piston is hydraulically biased in either axial direction for positively shifting the ring gear. A speed reduction ratio of about 3 or 4:1 is obtained in the secondary mode so that when the planetary gear mechanism is used in a vehicle a relatively low ground speed is maintainable which is especially useful for specialized attachments such as a snow blower, broom or the like. With this construction the sun gear transmits only a relatively small proportion of the total torque during the normal direct drive mode so that an economical construction is possible.

24 Claims, 2 Drawing Sheets

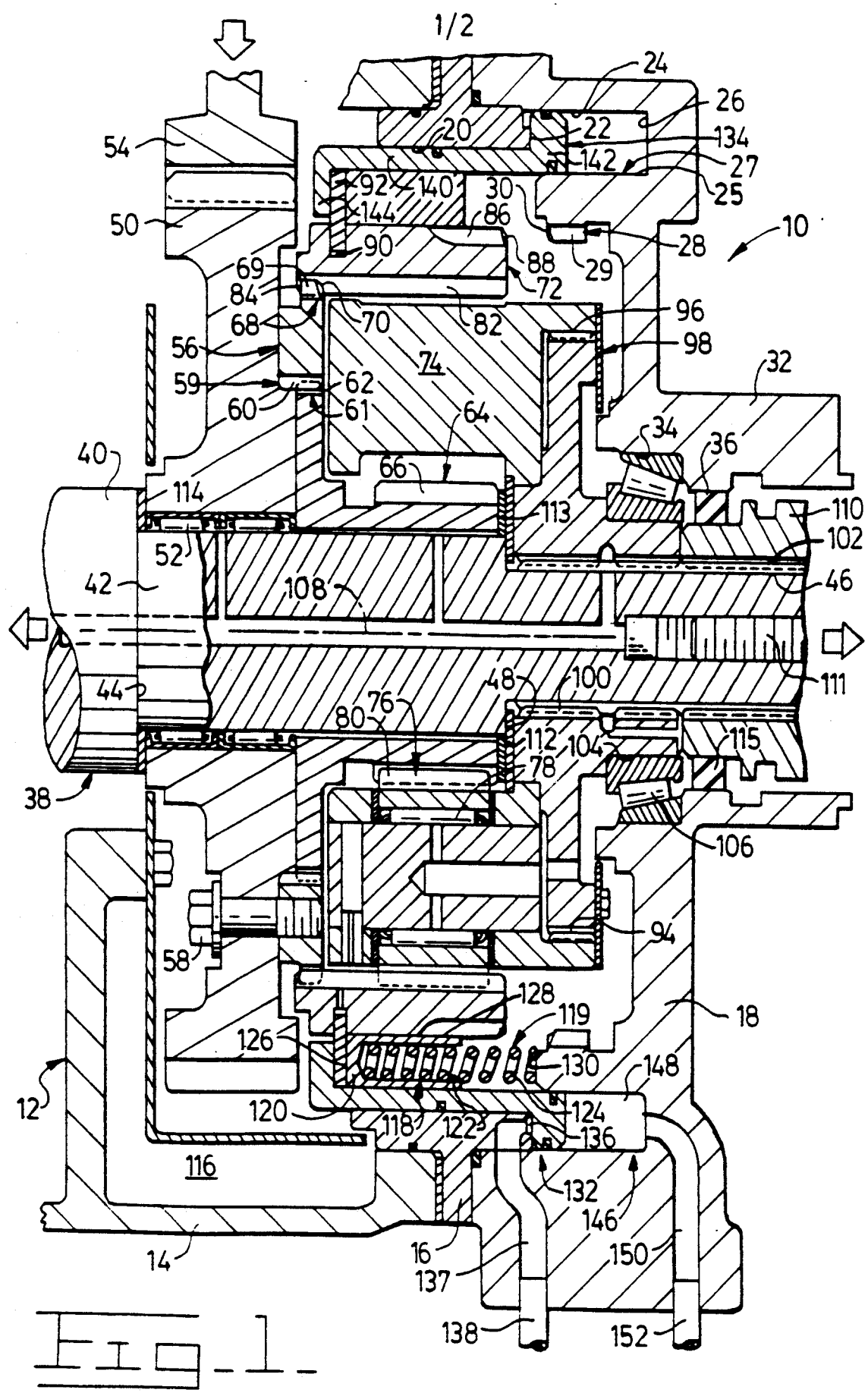
Fig_1

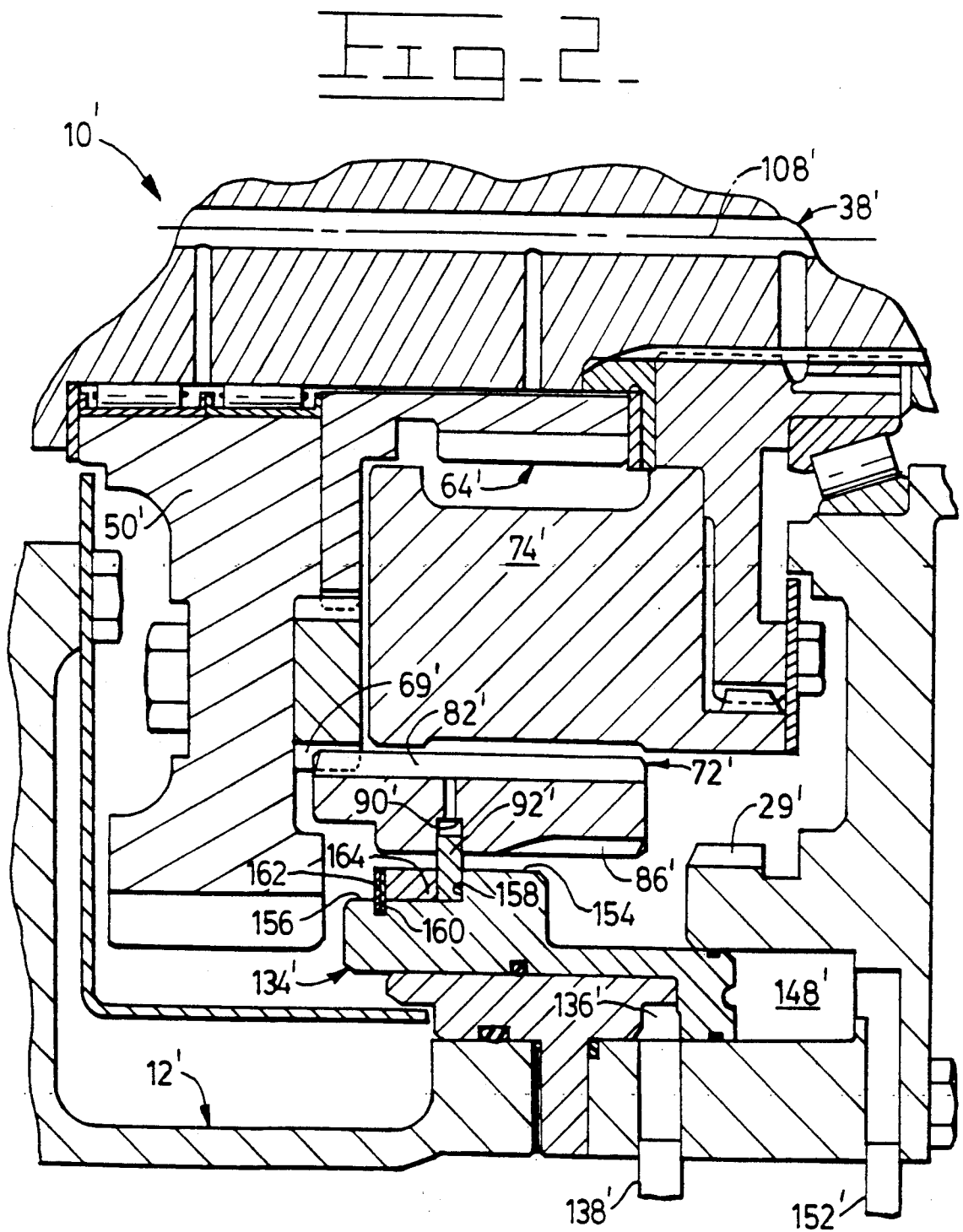

TWO-SPEED PLANETARY GEAR MECHANISM

TECHNICAL FIELD

This invention relates generally to a two-speed transmission of the planetary gear type, and more particularly to a compact planetary gear mechanism having an axially displaceable ring gear and a juxtaposed operating piston for providing either a direct drive mode or a speed reduction ratio mode.

BACKGROUND ART

U.S. Pat. No. 1,413,943 issued Apr. 25, 1922 to J. C. Snyder, U.S. Pat. No. 1,514,872 issued Nov. 11, 1924 to C. E. Starr, and U.S. Pat. No. 2,331,684 issued Oct. 12, 1943 to J. E. Henningsen are generally illustrative of planetary gear mechanisms that utilize a manually shifted internal ring gear element. In a first axial position the ring gear is nonrotatably connected to the housing of the mechanism to provide a speed reduction ratio at the output, while in a second axial position thereof the ring gear is connected for joint rotation with the planet carrier so that the planetary gear mechanism rotates as a unit for direct drive. One significant disadvantage of these mechanisms is that the sun gear must continually handle the full input torque. This requires that the sun gear, the planet gears, and the planet bearings be designed for greater capacity to carry such high loads in order to obtain the desired service life. In addition to such costly overdesign, these mechanisms utilize manually actuated shifter forks which require considerable operator effort, and a substantial number of costly components connected to the shifter forks that require excessive space.

U.S. Pat. No. 4,821,591, issued Apr. 18, 1989 to H. F. Adler, illustrates an axially displaceable ring gear that in one position provides a direct drive mode of operation of a planetary gear mechanism by connecting the input sun gear to the ring gear for joint rotation, and in the other provides a speed reduction ratio by connecting the ring gear to a stationary housing. While this is considerably more desirable from a torque transmission standpoint, the mechanism of U.S. Pat. No. 4,821,591 is more complex and costly in its construction than is desired, and incorporates a conventional unillustrated engaging fork for axially displacing the ring gear.

In view of the above, it would be advantageous to provide a reliable two-speed planetary mechanism that would avoid either the use of a costly and space-consuming shifter fork assembly or the use of a costly friction clutch assembly. Moreover, in order to extend the service lives of the sun and planet gears, it would be beneficial to construct and arrange the elements of the mechanism to transmit torque in dual paths when used the majority of the time in a first speed mode, and to transmit torque in a single path in a less frequently used second speed mode.

It would furthermore be desirable to provide a compact hydraulically-operated device for shifting the ring gear of the planetary gear mechanism positively in at least one axial direction between its two operating modes.

The present invention is directed to overcoming one or more of the problems as set forth above.

DISCLOSURE OF THE INVENTION

In one aspect of the present invention, a two-speed planetary gear mechanism is provided of the type having a sun gear, a ring gear, a planet carrier, and a plurality of planet gears supported by the carrier and operatively connected to the sun and ring gears. Significantly, the mechanism includes a housing and stationary coupling connected thereto, a rotating coupling connected to rotate with the sun gear, first means for urging the ring gear away from the stationary coupling and into engagement with the rotating coupling, and second means for urging the ring gear longitudinally away from the rotating coupling and into engagement with the stationary coupling, and wherein an annular piston is connected to the ring gear in a closely disposed relationship and at least one of the first and second means includes means for hydraulically moving the annular piston and the ring gear axially.

In accordance with another aspect of the invention, a two-speed planetary gear mechanism includes an input sun gear, a ring gear, an output planet carrier, a plurality of planet gears interengaged with the sun gear and the ring gear, and support means for rotatably supporting the sun gear and the planet carrier and including a stationary coupling. Also included are a rotating coupling connected to rotate with the sun gear, compressible spring means for urging the ring gear away from the stationary coupling into engagement with the rotating coupling, and hydraulically actuated piston means for urging the ring gear away from the rotating coupling and into engagement with the stationary coupling.

Advantageously, the instant planetary gear mechanism includes a hydraulically actuated piston which compactly encircles the ring gear and can cause the controlled axial movement of the ring gear in either one or two directions. And in the most frequently used direct drive mode the sun gear transmits only a relatively small proportion of the total torque so that the service life thereof can be extended.

Other objects and advantages of the present invention will become readily apparent upon reference to the accompanying drawings and following description.

BRIEF DESCRIPTION OF THE DRAWINGS

FIG. 1 is a diagrammatic, cross sectional elevational view of a two-speed planetary gear mechanism constructed in accordance with a first embodiment of the present invention; and FIG. 2 is an enlarged fragmentary view similar to FIG. 1, only showing a second embodiment of the present invention.

BEST MODE FOR CARRYING OUT THE INVENTION

Referring to FIG. 1, a two-speed planetary gear mechanism or transmission 10 can be noted to include a housing 12 defined by a partially illustrated case member 14 on the left, an annular holder 16 in the middle, and an end cover 18 on the right which are releasably secured together in the usual way. The holder 16 has an internal cylindrical bore 20 and an annular flat end surface 22 at the right end of the bore, and the end cover 18 has an internal cylindrical bore 24 of a larger diameter than the bore 20 that is substantially contiguous with the end surface 22. The end cover 18 also defines a radially outwardly facing cylindrical surface 25 and an end wall 26 connecting the bore 24 and surface 25 and forming an annular piston receiving slot 27 thereby. Furthermore, the end cover 18 includes a stationary coupling or internal ring gear 28 defining a plurality of internal teeth 29 having suitably inclined and rounded end surfaces 30 as is known in the art. The end cover also has a reduced diameter tubular portion 32 defining a cylindrical tapered roller bearing seat 34 and a cylindrical seal seat 36 laterally outwardly thereof.

The planetary gear mechanism 10 includes a stepped cylindrical output shaft 38 having an enlarged portion 40 at the left when viewing the drawing, a cylindrical central portion 42 of reduced diameter and defining an annular thrust surface 44 therebetween, and a splined output portion 46 of a further reduced diameter defining another annular thrust surface 48 therebetween. An input gear 50 is rotatably mounted on the central portion by a pair of needle bearing assemblies 52, and in actual use this gear is driven by a transfer gear 54 powerably rotated by a multispeed transmission of any conventional type, not shown.

A rotating coupling 56 is releasably secured to the input gear 50 as by a plurality of fastener assemblies 58, one example of which is shown. That rotating coupling includes an internal ring gear or spline 59 defining a plurality of internal teeth 60. The teeth 60 are in continuous intermeshing engagement with an external ring gear or spline 61 defining a plurality of external teeth 62. The external ring gear 61 is an integral part of an input sun gear 64 having a plurality of gear teeth 66. The rotating coupling 56 also has a plurality of external teeth 68 individually having inclined and rounded end surface 70 of the standard type.

The planetary gear mechanism 10 also includes a ring gear 72, a planet carrier 74, and a plurality of planet gears 76 rotatably mounted on the carrier by a corresponding plurality of needle bearing assemblies 78, one example of which is illustrated. Each planet gear 76 has a plurality of teeth 80 which are continuously engaged with a plurality of internal teeth 82 of the ring gear 72 and the external teeth 66 of the sun gear 64. The left end of the ring gear teeth 82 is also provided with conventional inclined and rounded end surfaces 84 to ease engagement, and the ring gear has a plurality of external teeth 86 with the right end thereof provided with conventional inclined and rounded end surfaces 88. An annular radially outwardly facing groove 90 is defined in the periphery of the ring gear 72 which is adapted to receive a pair of semi-circular thrust plates 92.

The planet carrier 74 has a plurality of internal coupling teeth 94 for locking engagement with a plurality of external coupling teeth 96 of an intermediate element 98. The intermediate element has an internal spline 100 that nonrotatably intermeshes with an external spline 102 of the shaft output portion 46, and has a radially outwardly facing seat 104 to receive a tapered roller bearing assembly 106 thereon. The bearing assembly 106, and another similar bearing assembly, not shown but disposed between the case member 14 and the left end of the enlarged portion 40 of the output shaft in a conventional manner, is effective to rotatably support the shaft 38, the input gear 50 and associated rotating coupling 56, and the intermediate element 98 for rotation about a common central axis 108. An output flange 110 is nonrotatably engaged with the external splines 102 and is releasably secured to the end of the output shaft 38 by a conventional threaded fastening device 111, only partially shown. When the fastening device is secured in place the output flange 110 is urged against the intermediate element 98 to force it against the thrust surface 48 of the output shaft through an intermediate thrust washer 112. One thrust washer or ring 113 is located between the intermediate thrust washer 112 and the sun gear 64, and another thrust washer or ring 114 is located between the thrust surface 44 and the input gear 50, and thereby the sun gear and the input gear are axially contained between the thrust surfaces 44 and 48. A conventional seal ring 115 is located between the tubular portion 32 of the housing 12 and the output flange 110, and similar seal means is provided at the opposite end of the output shaft although not illustrated to define a substantially enclosed compartment or chamber 116 within the housing 12.

In accordance with one aspect of the present invention, the planetary gear mechanism 10 includes first means 118 for continuously, resiliently, and mechanically urging the ring gear 72 in a first or leftward direction longitudinally away from the stationary coupling 28 and to a position of intermeshing engagement with the external ring gear 68 of the rotating coupling 56. Such first means 118 includes a compressible spring apparatus 119 having an annular plate member 120 defining a plurality of peripherally spaced cylindrical pockets 122 parallel to the central axis 108 that are adapted to receive a corresponding plurality of compression springs 124, one example of which is shown. The plate member 120 has an end surface 126 in continuously abutting engagement with the thrust plates 92, and an internal cylindrical bore 128 slightly larger in diameter than the external periphery of the ring gear 72. At one end the springs 124 are seated against the bottom of the respective pockets and at the other are seated against an annular seating surface 130 of the housing end cover 18.

Moreover, second means 132 are provided for selectively and hydraulically urging the ring gear 72 in a second or rightward direction longitudinally away from the rotating coupling 56 and to a position of intermeshing engagement with the stationary coupling 28 in opposition to the force provided by the springs 124. Such second means 132 includes an annular stepped piston 134 reciprocally and sealingly engaged with the bores 20 and 24 of the housing 12 and defining therewith a first annular pressurizable chamber 136 therebetween, and a passage 137 communicating with that chamber and a selectable first source of hydraulic pressure 138 in a controlled manner. More specifically, the stepped piston 134 is defined by a centrally disposed, cylindrical sleeve portion 140, a radially outwardly extending piston flange end 142, and a radially inwardly extending thrust flange end 144; these three integrally associated portions are all compactly contained within the housing 12 in a closely encircling relationship with the ring gear 72 and the compressible spring apparatus 119.

Furthermore, third means 146 are provided for selectively and hydraulically urging the piston 134 in the first or leftward direction when viewing the drawing to a retracted position of abutting engagement with the annular surface 22 of the holder 16. Since the reciprocable piston 134 is sealingly engaged with both the bore 24 and the cylindrical surface 25 of the housing 12, a second annular pressurizable chamber 148 is defined at the other end of the piston receiving slot 27. Another passage 150 communicates the second chamber 148 with a selectable second source of hydraulic pressure 152 in a controlled manner.

INDUSTRIAL APPLICABILITY

In operation, the planetary gear mechanism 10 can be used on a vehicle downstream of a conventional and reversible multi-speed transmission, not shown. The large majority of the time the planetary gear mechanism will be disposed in a direct drive mode wherein the ring gear 72 will be positioned to the left as is shown by FIG. 1. In that mode in the first embodiment there is either a very low hydraulic pressure or an absence of fluid pressure in the first source 138 and the first chamber 136, and a first preselected hydraulic pressure level, for example approximately 2,070 kPa (300 psi), in the second source 152 and the second chamber 148 communicating therewith. Thus, the piston 134 is hydraulically moved axially to the left when viewing the drawing to a fully retracted position against the end surface 22 of the housing 12, and the force of the compression springs 124 positively biases the ring gear to the left. The force of the springs is transmitted through the annular plate member 120 and the thrust plates 92 to hold the ring gear to the left and the teeth 69 and 82 in the intermeshed mode. Thus the input gear 50 and the ring gear 72 are caused to rotate together, and since the sun gear 64 is always conjointly connected to the input gear through the intermeshing teeth 60 and 62, the sun gear and the ring gear rotate as a unit. This provides a direct drive or 1:1 reduction with an advantageously small proportion of the total torque passing through the sun gear, and a relatively large proportion of the total torque passing through the ring gear.

When it is desired to operate the planetary gear mechanism 10 in the speed reduction mode the fluid pressure is dropped to a very low pressure or an absence of pressure in the second pressure source 152 and the second chamber 148, and pressure is controllably supplied to the first pressure source 138 and the first chamber 136 to overcome the leftward force of the compression springs 124 on the piston 134. Preferably, the second preselected pressure level supplied to the first chamber 136 is less than the first preselected pressure level supplied earlier to the second chamber 148, for example approximately 690 kPa (100 psi). Whereupon the piston is urged to the right when viewing the drawing to cause the rightward movement of the thrust plates 92 and the rounded end surfaces or leading edges 88 of the ring gear teeth 86 so that they appropriately engage the corresponding rounded end surfaces 30 of the stationary reaction teeth 29.

When it is desired to return to the direct drive mode, the pressure is dropped to either a very low value or an absence of pressure in the first chamber 136 and the second chamber 148 is pressurized at the first preselected pressure level. This causes rapid axially displacement of the piston 134 to the leftward fully retracted position such that the thrust flange end 144 is displaced axially away from the thrust plates 92, whereupon the force of the compression springs 122 is sufficient to urge the rounded end surfaces or leading edges 84 of the ring gear teeth 82 to intermeshingly engage the rounded leading edges 70 of the coupling teeth 69. Since the compression springs do not have to retract the piston, no force is detracted therefrom that might be required to displace the fluid radially outwardly from the first chamber 136. As a result, if there is a temporary butt engagement of the teeth 69 and 82, then the compression springs can relatively rapidly urge the ring gear into engagement at the proper rotational speed difference therebetween.

In one embodiment of the present invention the principle elements of the planetary gear mechanism 10 had the following numbers of teeth:

ring gear teeth 82=82 teeth
planet gear teeth 80=24 teeth
sun gear teeth 66=34 teeth With the above-noted numbers of teeth the reduction ratio between the speed of the input gear 50 and the output planet carrier 74 and/or the output shaft 38 secured thereto is 3.41:1. This reduction, with the ring gear 72 disposed to the right of the position shown in the drawing and into a grounded relationship with the housing 12, is effective to provide relatively low or creeper speed operation of the vehicle. For example, the vehicle could be equipped with an attachment such as a snow-blower or a road surface sweeper or the like although not illustrated herein. In this less frequently used mode of operation all input torque passes in a single path through the sun gear 64.

In the direct drive mode, with the ring gear 72 disposed to the left as shown in the drawing, the input torque is divided into two paths. With the above-noted tooth relationships about 70% of the input torque is transmitted through the ring gear 72, and the remainder or 30% is transmitted through the sun gear 64. Thus, when driving the vehicle the majority of the time at somewhat faster ground speed levels the sun gear transmits only a portion of the total torque so that the planetary gear mechanism 10 can be more economically constructed.

In the event of any unexpected loss of hydraulic pressure of the source 138 leading to the piston chamber 136 during loading of the vehicle in the creeper mode, the ring gear 72 would be positively urged to the left by the spring apparatus 119 into the direct drive mode. This is better than failing into a speed reduction mode because the latter could cause an overly severe or objectionable deceleration rate from the normally faster travelling speed.

SECOND EMBODIMENT

A second embodiment planetary gear mechanism 10' is shown in FIG. 2. Elements similar to those described with respect to the embodiment of FIG. 1 will bear the same reference numbers with a prime indicator affixed thereto.

The second embodiment differs from the first embodiment by eliminating the compressible spring apparatus and by axially displacing the ring gear 72' solely by hydraulically pressurizing the first chamber 136' or the second chamber 148'. More specifically, the annular piston 134' has an inner cylindrical bore 154 and an increased diameter cylindrical bore 156 adjacent thereto defining an annular thrust surface 158 therebetween. An annular groove 160 opens radially inwardly on the bore 156, and a conventional closable retaining ring 162 is disposed in the groove. In this instance, the pair of semi-circular thrust plates 92' internally connected in the ring gear groove 90' are externally contained between the thrust surface 158 and a hardened thrust ring 164 held securely in place by the retaining ring 162.

INDUSTRIAL APPLICABILITY OF SECOND EMBODIMENT

In the operation of the FIG. 2 embodiment, hydraulic pressure at approximately 2,070 kPa (300 psi) is normally present in the second chamber 148' and there is no pressure in the first chamber 136' so that the annular piston 134' and ring gear 72' are urged positively to the left for the direct drive mode In this mode the internal ring gear teeth 82' are interengaged with the coupling teeth 69' and the ring gear rotates as a unit with the sun gear 64' as can be visualized with reference to FIG. 1.

In order to obtain the speed reduction ratio, the hydraulic pressure is dropped toward zero in the second chamber 148' and raised to a similar 2,070 kPa level in the first chamber 136'. This urges the annular piston 134', and the ring gear 72' Collectively to the right when viewing FIG. 2 so that the external ring gear teeth 86' are positively engaged with the stationary coupling teeth 29' as also generally discussed above.

The second embodiment is more economical in construction and easier to assembly since no mechanical spring apparatus is incorporated therewith. It also has the advantage of utilizing relatively high forces in both directions of engagement of the coupling teeth, whereas in the first embodiment the engagement forces associated solely with the compressible spring apparatus 119 were substantially lower. In the event of a pressure failure in either of the actuating chambers 136' and 148' the planetary gear mechanism 10' will remain in the same mode because of the holding friction between the teeth 29',86' and 69',82'.

Other aspects, objects and advantages of this invention can be obtained from a study of the drawings, the disclosure and the appended claims.

We claim:

1. In a two-speed planetary gear mechanism of the type having a sun gear, a ring gear, a planet carrier, and a plurality of planet gears rotatably supported by the planet carrier and operatively connected to the sun gear and the ring gear, the improvement comprising:
    a stationary coupling;
    a rotating coupling connected to rotate with the sun gear;
    first means for urging the ring gear in a first direction longitudinally away from the stationary coupling and into engagement with the rotating coupling;
    second means for urging the ring gear in a second direction longitudinally away from the rotating coupling and into engagement with the stationary coupling; and
    wherein one of the first and second means includes a compressible spring apparatus, and the other includes an annular piston closely disposed to the ring gear and hydraulic means for hydraulically moving and extending the annular piston axially in opposition to the compressible spring apparatus.

2. The planetary gear mechanism of claim 1 including third means for hydraulically retracting the annular piston and allowing rapid engagement of the ring gear with the rotating coupling by the compressible spring apparatus.

3. The planetary gear mechanism of claim 2 including a housing reciprocatingly containing the annular piston and defining therewith a first chamber, and wherein the hydraulic means includes means for selectively pressurizing the first chamber and moving the annular piston in the second direction.

4. The planetary gear mechanism of claim 3 wherein the housing and the annular piston define a second chamber, and the third means includes means for selectively pressurizing the second chamber and moving the annular piston in the first direction.

5. The planetary gear mechanism of claim 4 wherein the stationary coupling has a plurality of internal teeth and the ring gear has a plurality of external teeth adapted to intermeshingly engage the internal teeth.

6. The planetary gear mechanism of claim 1 wherein the annular piston is disposed in a generally encircling relationship to the ring gear.

7. The planetary gear mechanism of claim 6 wherein the second means includes a thrust plate connected to the ring gear and acted upon by the piston solely in the second direction of movement thereof.

8. The planetary gear mechanism of claim 7 wherein the first means includes an annular plate member defining a plurality of pockets, the compressible spring apparatus includes a compression spring contained in each of the pockets, and the plate member is seated against the thrust plate.

9. A two-speed planetary gear mechanism comprising:
    an input sun gear;
    a ring gear;
    an output planet carrier;
    a plurality of planet gears rotatably supported by the planet carrier and interengaged with the sun gear and the ring gear;
    support means for rotatably supporting the sun gear and the planet carrier and including a stationary coupling;
    a rotating coupling connected to rotate with the sun gear;
    compressible spring means for urging the ring gear axially away from the stationary coupling into engagement with the rotating coupling; and
    hydraulically actuated piston means for controllably urging the ring gear axially away from the rotating coupling into engagement with the stationary coupling.

10. The planetary gear mechanism of claim 9 wherein the compressible spring means includes an annular plate member defining a plurality of pockets and a plurality of springs individually received in the pockets and seated against the support means.

11. The planetary gear mechanism of claim 10 wherein the piston means includes a piston disposed in a generally encircling relationship with the compressible spring means and the ring gear.

12. The planetary gear mechanism of claim 11 wherein the piston has a centrally disposed cylindrical sleeve portion, a radially outwardly extending flange end, and a radially inwardly extending thrust flange end.

13. The planetary gear mechanism of claim 12 wherein the compressible spring means includes a thrust member connected to the ring gear and located axially between the annular plate member and the radially inwardly extending thrust flange end of the piston.

14. The planetary gear mechanism of claim 13 wherein the piston means includes means for controllably and hydraulically urging the piston axially away from the stationary coupling and permitting rapid engagement of the ring gear with the rotating coupling by the compressible spring means.

15. The planetary gear mechanism of claim 9 wherein the piston means includes an annular piston defining with the support means first and second oppositely pressurizable chambers.

16. The planetary gear mechanism of claim 9 wherein the stationary coupling has a plurality of internal teeth and the ring gear has a plurality of external teeth selectively engageable with the internal teeth.

17. The planetary gear mechanism of claim 16 wherein the rotating coupling has a plurality of external teeth and the ring gear has a plurality of internal teeth selectively engageable with the external teeth.

18. In a two-speed planetary gear mechanism of the type having an input sun gear, a ring gear, an output planet carrier, and a plurality of planet gears supported by the planet carrier and operatively connected to the sun gear and the ring gear, the improvement comprising;
 a stationary coupling;
 a rotating coupling connected to the sun gear;
 a compressible spring apparatus for disconnecting the ring gear from the stationary coupling and connecting the ring gear to the rotating coupling; and
 a hydraulically actuated annular piston for disconnecting the ring gear from the rotating coupling and connecting the ring gear to the stationary coupling in opposition to the compressible spring apparatus.

19. The planetary gear mechanism of claim 18 including means for hydraulically urging the annular piston to a fully retracted position and allowing the compressible spring apparatus to relatively rapidly connect the ring gear to the rotating coupling.

20. In a two-speed planetary gear mechanism of the type having a sun gear, a ring gear, a planet carrier, and a plurality of planet gears rotatably supported by the planet carrier and operatively connected to the sun gear and the ring gear, and a surrounding housing, the improvement comprising:
 a stationary coupling connected to the housing;
 a rotating coupling connected to rotate with the sun gear;
 an annular piston reciprocably connected to the housing and connected to the ring gear in a closely disposed relationship;
 first means for urging the ring gear in a first direction longitudinally away from the stationary coupling and into engagement with the rotating coupling;
 second means for urging the ring gear in a second direction longitudinally away from the rotating coupling and into engagement with the stationary coupling; and
 wherein at least one of the first and second means includes means for positively hydraulically moving the annular piston and the ring gear axially.

21. The planetary gear mechanism of claim 20 wherein the annular piston generally encircles the ring gear and is connected to reciprocate therewith by a thrust plate.

22. The planetary gear mechanism of claim 21 wherein the annular piston defines with the housing first and second chambers, the first means includes means for controllably pressurizing the first chamber, and the second means includes means for controllably pressurizing the second chamber.

23. The planetary gear mechanism of claim 20 wherein the other one of the first and second means includes a compressible spring apparatus.

24. In a two-speed planetary gear mechanism of the type having a sun gear, a ring gear, a planet carrier, and a plurality of planet gears rotatably supported by the planet carrier and operatively connected to the sun gear and the ring gear, and a surrounding housing, the improvement comprising:
 a stationary coupling connected to the housing;
 a rotating coupling connected to rotate with the sun gear;
 an annular piston reciprocably connected to the housing and connected to the ring gear in a closely disposed relationship;
 first means for hydraulically urging the annular piston and the ring gear in a first direction away from the stationary coupling and positively into engagement with the rotating coupling; and
 second means for hydraulically urging the annular piston and the ring gear in a second direction away from the rotating coupling and positively into engagement with the stationary coupling.

* * * * *